(12) United States Patent
Kitayoshi

(10) Patent No.: US 7,187,324 B2
(45) Date of Patent: Mar. 6, 2007

(54) RADIOWAVE MONITORING METHOD AND APPARATUS

(75) Inventor: Hitoshi Kitayoshi, Tokyo (JP)

(73) Assignee: Advantest Corp., Tokyo (JP)

( * ) Notice: Subject to any disclaimer, the term of this patent is extended or adjusted under 35 U.S.C. 154(b) by 675 days.

(21) Appl. No.: 09/924,235

(22) Filed: Aug. 8, 2001

(65) Prior Publication Data

US 2002/0115411 A1    Aug. 22, 2002

(30) Foreign Application Priority Data

Aug. 21, 2000 (JP) ............... 2000-250028

(51) Int. Cl.
*G01S 5/03* (2006.01)
(52) U.S. Cl. ..................... 342/360; 455/463
(58) Field of Classification Search ............ 342/360, 342/464, 463, 465
See application file for complete search history.

(56) References Cited

U.S. PATENT DOCUMENTS 5,689,812 A * 11/1997 Takahashi ............ 455/67.16
6,026,304 A * 2/2000 Hilsenrath et al. ...... 455/456.2
6,140,964 A * 10/2000 Sugiura et al. ............ 342/464
6,249,680 B1 * 6/2001 Wax et al. ............... 455/456.2
6,487,417 B1 * 11/2002 Rossoni et al. .......... 455/67.16
6,496,701 B1 * 12/2002 Chen et al. .............. 455/456.5
6,782,265 B2 * 8/2004 Perez-Breva et al. ..... 455/456.1
6,785,547 B1 * 8/2004 Heiska et al. ............. 455/446

FOREIGN PATENT DOCUMENTS

JP        11-326482 A2      11/1999

* cited by examiner

*Primary Examiner*—Gregory C. Issing
(74) *Attorney, Agent, or Firm*—Muramatsa & Associates

(57) ABSTRACT

Arrival directions and patterns of intensities of radiowaves are observed by a monitor station 12a. An observed pattern given by the monitor station 12a is compared with simulated patterns of intensities and emitting directions of a simulated radiowave, and a position whose simulated pattern shows the best correlation with the observed pattern given by the monitor station 12a is identified as a location of the radiowave emitting source. Accordingly, a time for preparing data base by the radiowave propagation simulation can be decreased, and the radiowave monitor can be more efficient.

15 Claims, 7 Drawing Sheets

MONITOR STATION
(OBSERVED VALUE)
12a

MONITOR STATION
(OBSERVED VALUE)
12b

MONITOR STATION
(OBSERVED VALUE)
12c

MONITOR STATION
(ESTIMATED VALUE)
12a

MONITOR STATION
(ESTIMATED VALUE)
12b

MONITOR STATION
(ESTIMATED VALUE)
12c

ESTIMATED ANTENNA DIRECTIVITY

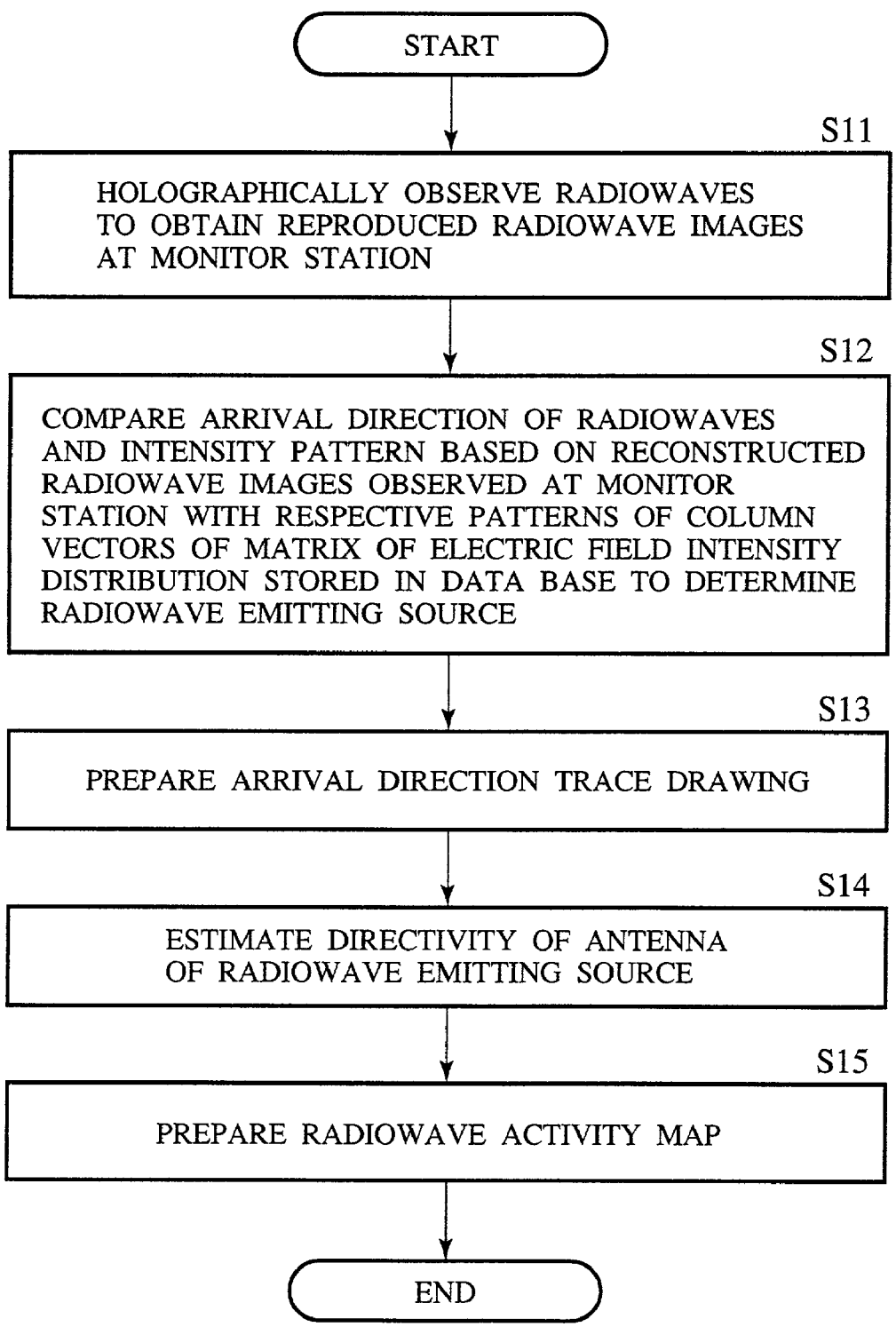

RADIOWAVE MONITORING METHOD AND APPARATUS

BACKGROUND OF THE INVENTION

The present invention relates to a radiowave monitoring method and apparatus which can identify a location of a radiowave emitting source, such as an illegal radio station or the like usage, in a prescribed area and monitor radiowave environments.

Conventionally, in identifying a location of a radiowave emitting source, such as an illegal radio station in a prescribed area, monitor stations are disposed at a plurality of positions, and the respective radiowave monitor stations observe arrival bearings of the radiowaves from the radiowave emitting source by means of Yagi-Uda array antennas, goniometers or others. The respective monitor stations plot the arrival bearings on a map to thereby estimate the location of the radiowave emitting source, based on an intersection of the respective bearings.

The above-described conventional method is based on the presumption that radiowaves from a radiowave emitting source being monitored propagate rectilinearly along a single path to a monitor station. Actually, however, radiowaves from a radiowave emitting source propagated to a monitor station, in some cases are diffracted by or reflected on topographies, and ground objects, such as buildings, etc. Radiowaves from a radiowave emitting source propagated to a monitor station, in other cases, are separated in multi-paths under the influence of topographies and ground objects. The estimation of a location of a radiowave emitting source by the conventional method noted above has a problem that radiowaves are diffracted or reflected or divided into multi-paths, which lowers accuracy of estimating the location of the radiowave emitting source.

The inventors of the present application already proposed a wide-area radiowave monitoring method and apparatus which can solve the above-described problem (refer to, e.g., Japanese Patent Application Laid-Open Publication No. Hei 11-326482 (1999)).

In the wide-area radiowave monitoring method described in Japanese Patent Application Laid-Open Publication No. Hei 11-326482 (1999), through a computer simulation, one or more monitor stations are disposed in a certain area, radiowave emitting sources are assumed to be present at a plurality of locations in the area, and arrival bearings of radiowaves from the radiowave emitting sources that propagate to the monitor stations are computed for the respective radiowave emitting sources, incorporating the topographical information of the area, while the monitor stations observe, for respective divided propagation paths, radiowaves from a radiowave emitting source. The arrival bearings observed by the monitor stations, and the results of the computer simulation are compared with each other to detect the computer simulation results for arrival bearings of the results, which are most similar to the observed arrival bearings of the radiowaves, and a corresponding location is judged to be a potential location of the radiowave emitting source. Further, on the presumption that the radiowave emitting source is present near the potential location, the computer simulation is executed, while djusting a location of the radiowave emitting source, to thereby determine the final location of the radiowave emitting source.

The above-described method can accurately determine a location of a radiowave emitting source even in a case that radiowaves are diffracted or reflected.

However, in the wide-area radiowave monitoring method and apparatus described in the specification of Japanese Patent Application Laid-Open Publication No. Hei 11-326482 (1999), arrival bearings of radiowaves incoming to the monitor stations from radiowave emitting sources at a plurality of locations in an area are computed by the computer simulation for the respective locations, which requires a plurality of sets of data base provided by the computer simulation of the radiowave propagation to be prepared for unidentified radiowave emitting sources. Furthermore, it takes much time to prepare the data base.

SUMMARY OF THE INVENTION

An object of the present invention is to provide a radiowave monitoring method and apparatus which can shorten the time for preparing a data base for the radiowave propagation simulation to make the radiowave monitor more efficient.

The above-described object is achieved by a radiowave monitoring method comprising the steps of: comparing an observed pattern of intensities versus arrival directions of a radiowave, which is emitted from a radiowave emitting source, observed at one position in an observation area with simulated patterns of intensities at other plural positions in the observation area versus emitting directions of a simulated radiowave emitted from the one position, the simulated patterns being obtained while changing the emitting direction of the simulated radiowave; and identifying a position out of the plural positions whose simulated pattern shows the best correlation with the observed pattern at the one position as a location of the radiowave emitting source.

In the above-described radiowave monitoring method, it is possible that in creating the simulated patterns of the intensities versus the emitting directions of the simulated radiowave emitted from the one position, the observation area is two-dimensionally divided into a plurality of regions, and electric field intensities to be observed in the respective regions are computed.

In the above-described radiowave monitoring method, it is possible that in creating the simulated patterns of the intensities versus the emitting directions of the simulated radiowave emitted from the one position, the observation area is three-dimensionally divided into a plurality of spaces, and electric field intensities to be observed in the respective spaces are computed.

In the above-described radiowave monitoring method, it is possible that in creating the simulated patterns of the intensities versus the emitting directions of the simulated radiowave emitted from the one position, while changing the emitting direction of the simulated radiowave emitted from the one position, the electric field intensities to be observed in the respective regions or the respective spaces are computed to give electric field intensity distributions for the respective emitting directions.

In the above-described radiowave monitoring method, it is possible that in creating the simulated patterns of the intensities versus the emitting directions of the simulated radiowave emitted from the one position, geography and ground objects in the observation area are taken into consideration.

In the above-described radiowave monitoring method, it is possible that based on the location of the identified radiowave emitting source and the simulation result, propagation path of the radiowave from the radiowave emitting source to the one position is traced.

In the above-described radiowave monitoring method, it is possible that based on a result of tracing the propagation path, antenna directivity of the radiowave emitting source is estimated.

In the above-described radiowave monitoring method, it is possible that based on the estimated antenna directivity of the radiowave emitting source, an electric field intensity distribution of the radiowave emitted from the radiowave emitting source is computed.

The above-described object is also achieved by a radiowave monitoring apparatus comprising: a radiowave observing means disposed at one position in an observation area, for observing a pattern of intensities versus arrival directions of a radiowave emitted from a radiowave emitting source; a storing means for storing simulated patterns of intensities at other plural positions in the observation area versus emitting directions of a simulated radiowave emitted from said one position, the simulated patterns being obtained while changing the emitting direction of the simulated radiowave; and a radiowave emitting source identifying means for comparing the pattern observed by the radiowave observing means with the simulated patterns stored in the storing means to identify a position out of the plural positions whose simulated pattern shows the best correlation with the pattern observed by the radiowave observing means at the one position as the location of a radiowave emitting source.

In the above-described radiowave monitoring apparatus, it is possible that the storing means two-dimensionally divides the observation area into a plurality of regions, and computes electric field intensities of the simulated radiowave emitted from the one position, which are to be observed in the respective regions.

In the above-described radiowave monitoring apparatus, it is possible that the storing means three-dimensionally divides the observation area into a plurality of spaces and computes electric field intensities of the simulated radiowave emitted from the one position, which are to be observed in the respective spaces.

In the above-described radiowave monitoring apparatus, it is possible that the storing means stores electric field intensities of the simulated radiowave emitted from the one position in different directions, which are to be observed in the respective regions or the respective spaces, for the respective directions.

In the above-described radiowave monitoring apparatus, it is possible that the apparatus further comprises a propagation path tracing means for tracing a propagation path of the radiowave from the radiowave emitting source to the one position, based on the location of the radiowave emitting source identified by the radiowave emitting source identifying means and the simulation result.

In the above-described radiowave monitoring apparatus, it is possible that the apparatus further comprises an antenna directivity estimating means for estimating antenna directivity of the radiowave emitting source, based on a result of tracing the propagation path given by the propagation path tracing means.

In the above-described radiowave monitoring apparatus, it is possible that the apparatus further comprises an electric field intensity computing means for computing an electric field intensity distribution of the radiowave emitted from the radiowave emitting source, based on the antenna directivity of the radiowave emitting source estimated by the antenna directivity estimating means.

As described above, according to the present invention, an observed pattern at one position is compared with simulated patterns of emitting directions of a simulated radiowave emitted from the one position, the simulated patterns being obtained while changing the emitting direction of the simulated radiowave, and a position out of the plural positions whose simulated pattern shows the best correlation with the observed pattern at the one position is identified as a location of the radiowave emitting source. Accordingly, a time for preparing data base by the radiowave propagation simulation can be decreased, and the radiowave monitor can be more efficient.

BRIEF DESCRIPTION OF THE DRAWINGS

FIG. 6 is a flow chart of a process of the radiowave monitoring method according to the embodiment of the present invention.

DETAILED DESCRIPTION OF THE INVENTION

Figure 1:
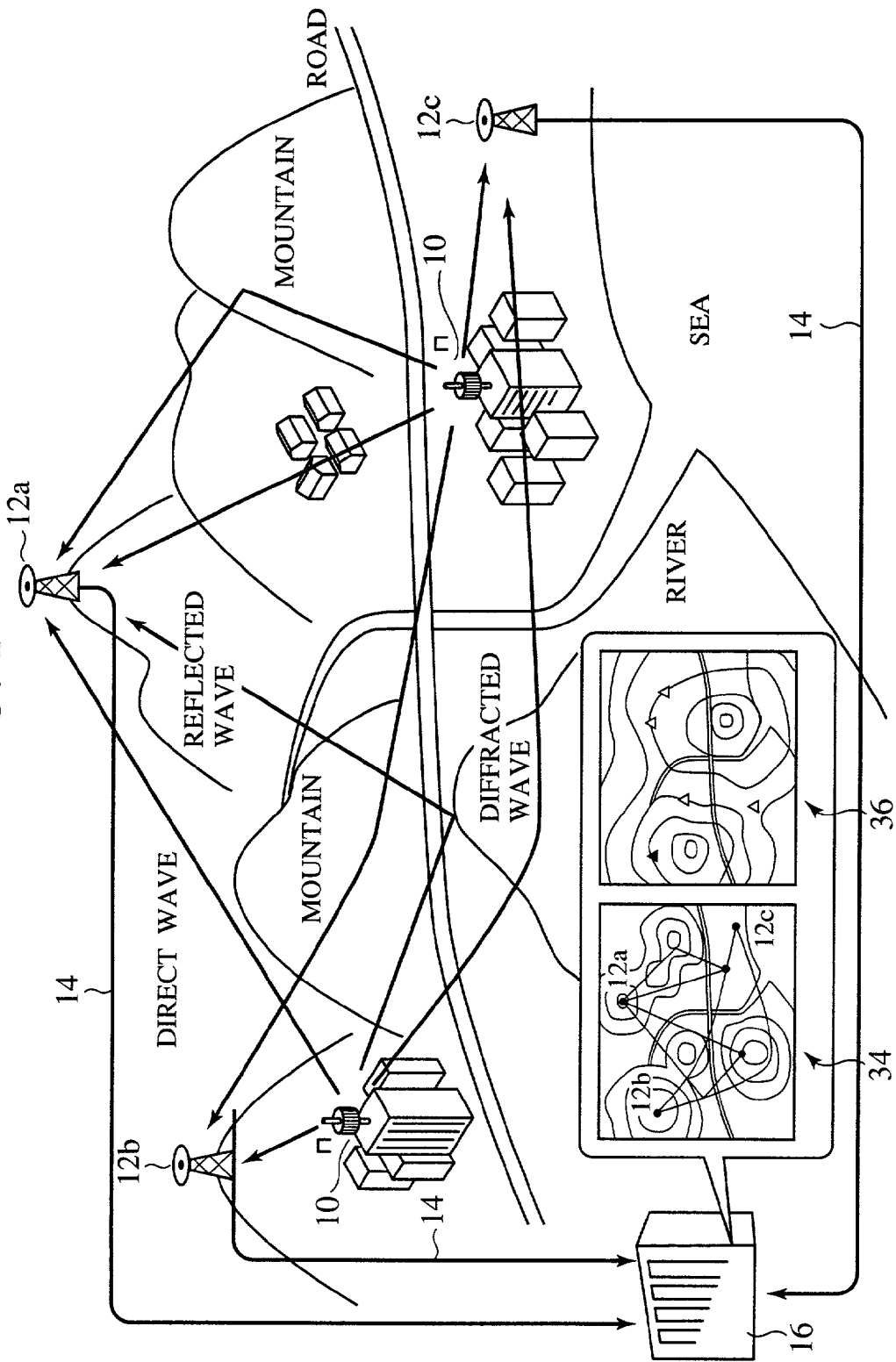
FIG. 1 is a schematic diagram showing the radiowave monitoring method according to one embodiment of the present invention.
Figure 2:
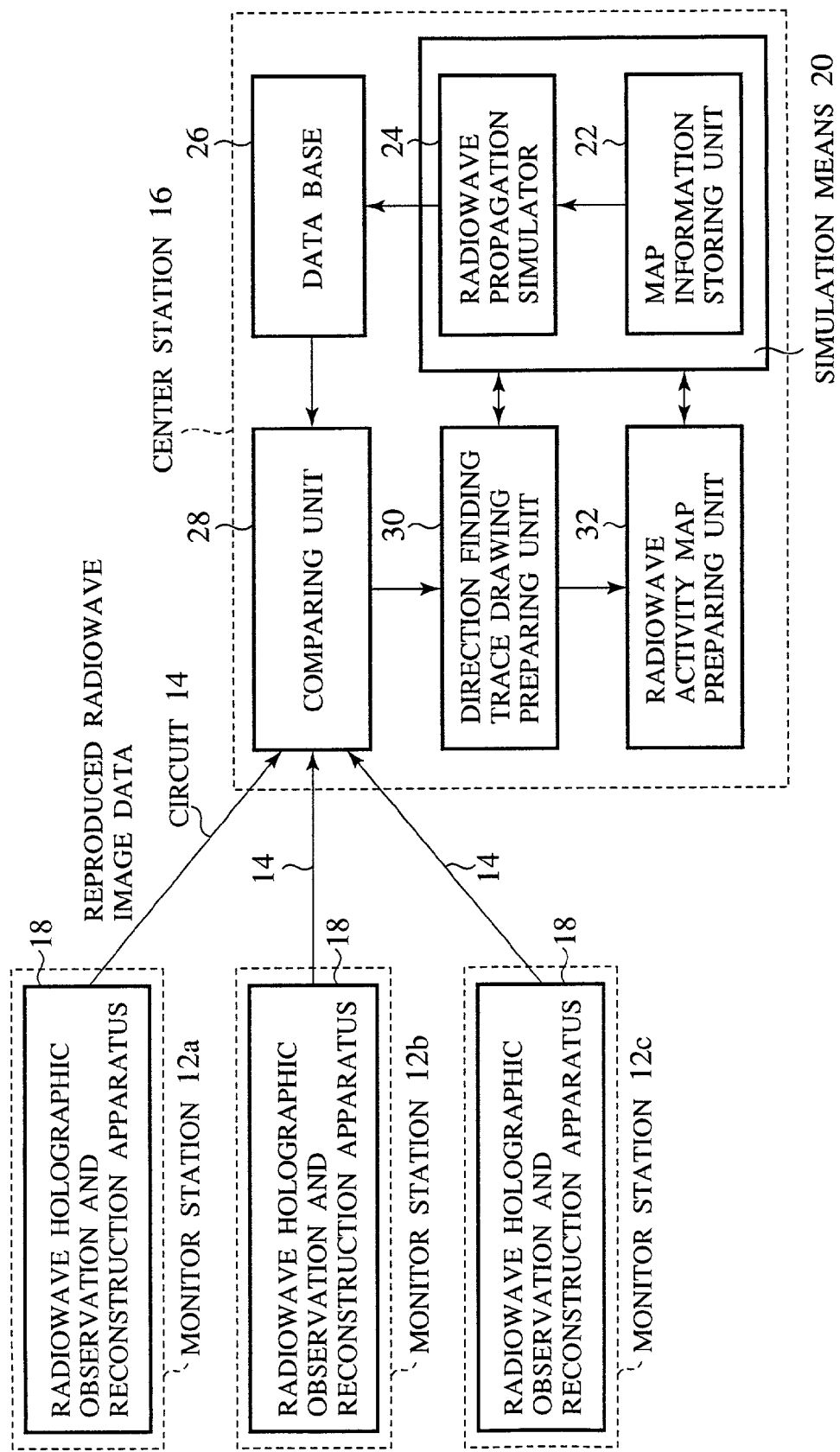
FIG. 2 is a block diagram of a constitution of the radiowave monitoring apparatus according to the embodiment of the present invention.
Figure 3:
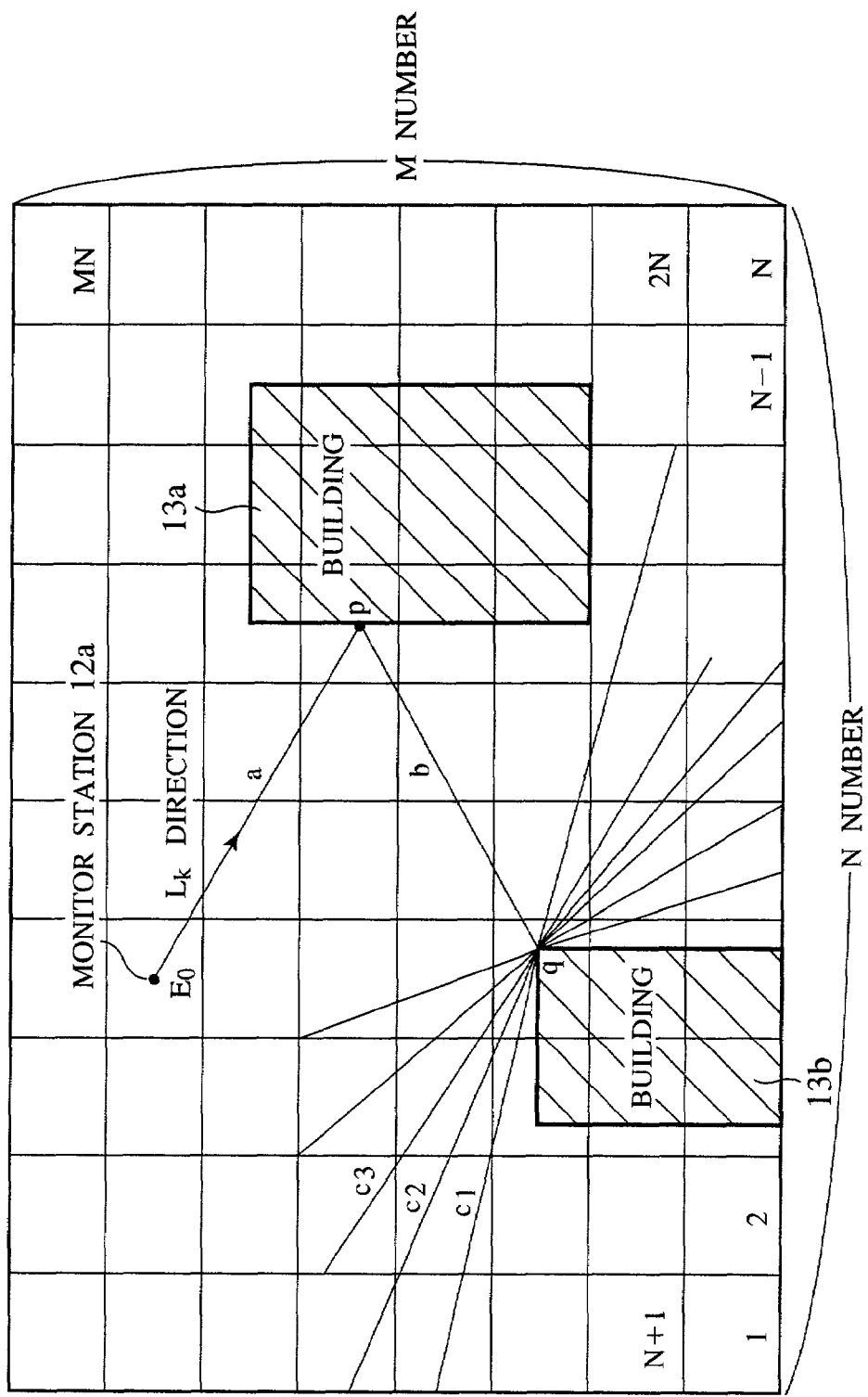
FIG. 3 is a schematic diagram showing a radiowave propagation simulation model.
Figure 4:
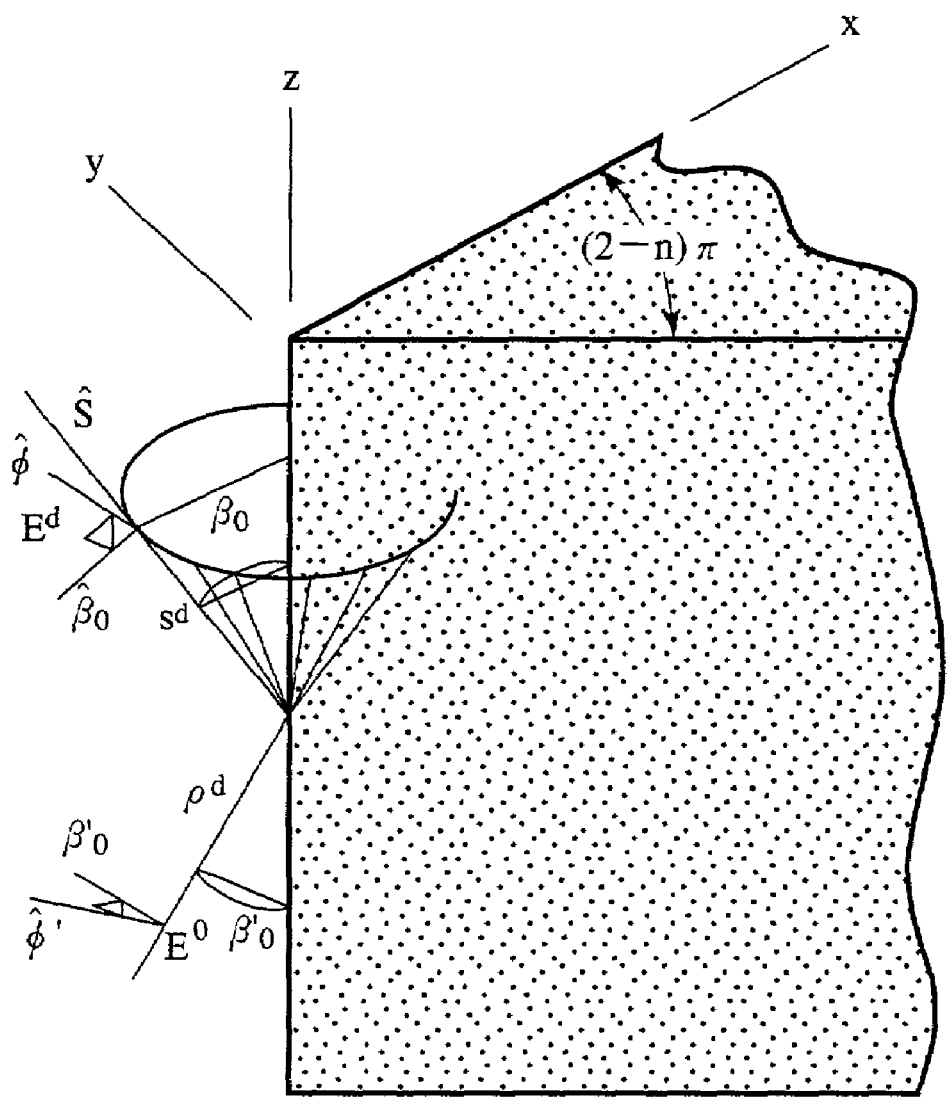
FIG. 4 is a schematic diagram showing a coordinate system for computing diffraction coefficients.

The radiowave monitoring method and apparatus according to one embodiment of the present invention will be explained with reference to FIGS. 1 to 6. FIG. 1 a constitution of the radiowave monitoring method according to the present embodiment. FIG. 2 shows a constitution of the radiowave monitoring apparatus according to the present embodiment. FIG. 3 shows a radiowave propagation simulation model. FIG. 4 shows a coordinate system for computing diffraction coefficients. FIGS. 5A–5G are views explaining a method for estimating the directivity of a transmission antenna of a radiowave emitting source. FIG. 6 is a flow chart of the process of the radiowave monitoring method.

(Radiowave Monitoring Apparatus)

The radiowave monitoring apparatus according to the present embodiment will be summarized with reference to FIG. 1.

A radiowave emitting source 10 is an emitting source for emitting radiowaves to be monitored. Here the radiowave emitting source 10 emits radiowaves of a frequency f1. For monitoring the radiowaves emitted by the radiowave emitting source 10, monitor stations 12a, 12b, 12c which conduct holographic observation of the emitted radiowaves are positioned in a monitor area. The monitor stations 12a, 12b, 12c are connected to a center station 16 via circuits 14. The center station 16 performs radiowave propagation simulation and compares simulation results (simulated pattern) with observation results (observed pattern) to identify the location of the radiowave emitting source 10.

Each monitor station 12a, 12b, 12c has a radiowave hologram observation and reconstruction apparatus 18 for performing holographic observation of radiowaves and outputting reconstructed radiowave images. The radiowave hologram observation and reconstruction apparatus 18 includes, e.g., a fixed antenna, and a scanning antenna which scans a scan observation plane. Radiowave images are reconstructed by correlating, for a prescribed observation frequency, between signals received by the fixed antenna and signals received by the scanning antenna with each other to produce correlated values (two-dimension complex inter-holograms) and reconstructing the two-dimensional inter-holograms.

The radiowaves from the radiowave emitting source 10 propagate to the respective monitor stations 12a, 12b, 12c. The radiowaves contain, in addition to components (direct waves) which have propagated from the radiowave emitting source 10 directly to the monitor stations, components (diffracted waves) and components (reflected waves) which have propagated, respectively diffracted and reflected by mountains and other ground objects. In the present embodiment, each monitor station 12a, 12b, 12c conducts radiowave hologram observation and reconstructs radiowave images so as to separate the components of respective propagation paths to obtain their arrival directions and intensities. Radiowaves, which are one kind of waves, can be holographically observed in the same way as in the holographic observation of light; thus, holograms are reconstructed to obtain reconstructed radiowave images, and based on the reconstructed radiowave images, a wave source distribution, intensities, etc. can be investigated. When component of respective propagation paths can be separated to be observed, the conventional direction finding technique may be used in place of the radiowave hologram observation.

The center station 16 includes simulation means 20 for performing computer simulation of radiowave propagation, a data base 26 for storing the results of the simulation made in advance by the simulation means 20, and a comparing unit 28 which compares the reconstructed radiowave images observed by the respective monitor stations 12a, 12b, 12c with an electric field intensity distribution obtained by the simulation. The center station 16 further includes a direction finding trace drawing preparing unit 30 which identifies a location of the radiowave emitting source 10, based on a comparison result produced by the comparing unit 28 and prepares to output a direction finding trace drawing, and a radiowave activity map preparing unit 32 which prepares and outputs in the form of a radiowave activity map an electric field intensity distribution of the radiowaves from the radiowave emitting source 10 whose location has been identified.

The simulation means 20 includes a map information storing unit 22 which stores information (map information) of a map, geography, ground objects, etc., and a radiowave propagation simulator 24 which simulates, with reference to the map information, radiowave emission from the monitor station 12 on the map to simulate radiowave propagation. The radiowave propagation simulator 24 performs computer simulation of an electric field intensity distribution that would be generated when the radiowave emission from a monitor station 12 on the map data is simulated, by using, e.g., a ray tracing method (refer to, e.g., IEEE Network Magazine, pp. 27–30, November, 1991) or a moment method (refer to, e.g. R. F. Harrington, Field Computation by Moment Methods, IEEE Press, 1993).

The data base 26 stores a matrix of the electric field intensity distribution computed by the simulation means 20. The matrix of the electric filed intensity distribution stored by the data base 26 is used by the comparing unit 28 when a location of the radiowave emitting source 10 is identified.

The comparing unit 28 compares a computer simulation result (simulated pattern) of the electric field intensity distribution for the simulated radiowave emission from the monitor station 12a that has been computed by the simulation means 20 and stored by the data base 26 with a result of actual radiowave holographical observation (observed pattern) obtained by the monitor station 12a. Based on the result of the comparison, a location of the radiowave emitting source 10 is identified.

The direction finding trace drawing preparing unit 30 traces radiowave propagation paths from the radiowave emitting source 10 whose location has been identified by the comparing unit 28 to the respective monitor stations 12a, 12b, 12c to prepare and output a direction finding trace map 34, and furthermore estimates an antenna directivity of the radiowave emitting source 10, based on the result of the trace.

Based on the location of the radiowave emitting source 10 identified by the comparing unit 28, and the estimation result of the antenna directivity of the radiowave emitting source 10 obtained by the direction finding trace drawing preparing unit 30, the radiowave activity map preparing unit 32 commands the simulation means 20 to execute the computer simulation of radiowave propagation to compute an electric field intensity distribution of radiowaves from the radiowave emitting source 10 on the map. The computed result is displayed and printed out in a radiowave activity map 36 of the radiowave emitting source 10.

The radiowave monitoring apparatus according to the present embodiment, which has the above-described constitution, is characterized in that, for simulated radiowave emission from the monitor station 12a on the map, an electric field distribution is computed in advance by computer simulation for respective regions corresponding to direction of the radiowave emission. Arrival directions and intensities of radiowaves obtained by reconstructed images of radiowaves actually observed by the monitor station 12a are compared with the electric field intensity distribution obtained by the computer simulation to thereby identify a location of the radiowave emitting source 10.

(Radiowave Monitoring Method)

Next, the radiowave monitoring method according to the present embodiment will be explained with reference to FIGS. 1 to 6.

Before electromagnetic waves are actually monitored, for simulated radiowave emission from the monitor station 12a on map data, an electric field intensity distribution is computer simulated in a two-dimensional model. The computer simulation for the electric field intensity distribution will be detailed with reference to FIGS. 3 and 4. The computer simulation which will be detailed below uses a ray tracing method. The ray tracing method is a method in which it is assumed that a number of rays (light rays) are emitted by a radiowave emitting source, and the rays are traced along their paths at certain angles. When a ray hits the ground or a building, the ray is further traced in a reflected direction from the position as a reflection point. When a ray hits an edge of a building, a plurality of rays are generated at the point as a diffraction point.

First, the radiowave propagation simulator 24, with reference to map data of an area for the simulation to be executed read from the map information storing unit 22, divides the area for the simulation to be executed into an M×N matrix of regions. The respective divided regions are represented by 1, 2, . . . , MN−1, MN in FIG. 3. Information of geography and ground objects is mapped in the map data. In FIG. 3, a building 13a and a building 13b are present in the area.

Subsequently, as shown in FIG. 3, a ray is emitted in an $L_k$ direction from the monitor station 12a, and propagation paths of the ray and electric field intensities of the ray passing through the respective regions are computed. Computed electric field intensities of the ray are recorded as elements of the matrix having ray numbers $L_k$ of emitted rays as the row numbers and region numbers as the column numbers. The matrix for recording the electric field intensities is shown in TABLE 1 below.

TABLE 1

| Region Number Ray Number $L_k$ | 1 | 2 | 3 | . . . | MN |
|---|---|---|---|---|---|
| 1 | $E_{11}$ | $E_{12}$ | $E_{13}$ | . . . | $E_{1MN}$ |
| 2 | $E_{21}$ | $E_{22}$ | | | |
| 3 | $E_{31}$ | | | | |
| . | . | | | | |
| . | . | | . | | |
| . | . | | | . | |

At this time, the ray has a thickness proportional to a propagation distance from the monitor station 12a as an origin, and when the ray of the thickness covers parts of the respective regions, the ray is considered to have passed the regions. When a plurality of rays have passed through one region, an electric field intensity of that of the rays which shows a highest intensity is recorded in the matrix of TABLE 1.

Such simulation process will be explained specifically with reference to a case as shown in FIG. 3 in which a ray emitted from the monitor station 12a as an origin in a direction $L_k$ (emitting direction) is reflected on the building 13a at a point p and arrives at the building 13b at a point q. Here, a line segment interconnecting the monitor station 12a and the point p is represented by a line segment a, and the line segment interconnecting the point p and the point q is represented by a line segment b.

For regions through which the line segment a of the ray emitted from the monitor station 12a as an origin to the point p has passed, electric intensities computed by the following Formula 1 are recorded in corresponding elements ($L_k$, region numbers) of the matrix.

$$E_0 \frac{\exp(-jkr)}{r} \quad (1)$$

where $E_0$ represents an electric field of the radiowaves emitted by the monitor station 12a, r represents a distance from the monitor station 12a to the centers of the respective regions, and k is a wave number of the radiowaves.

Subsequently, for regions through which the line segment b which has been reflected on the building 13a at the point p and arrived at the point q of the building 13b, electric field intensities computed by the following Formula 2 are recorded in corresponding elements ($L_k$, region numbers) of the matrix.

$$E_0 \frac{\exp(-jka)}{r} \cdot R \cdot \exp(-jkr') \frac{a}{a+r'} \quad (2)$$

where a represents a length of the line segment a, and r' represents a distance from the point p as an origin to the centers of the respective regions.

R represents a reflection coefficient and is given as follows.

First, a complex index of refraction n at the time when a plane wave is incident on a medium 2 from a medium 1 in accordance with Snell's law is expressed by the following Formula 3.

$$n = \sqrt{\frac{\mu_2}{\mu_1}} \sqrt{\frac{\varepsilon_2 - j\sigma_2/\omega}{\varepsilon_1 - j\sigma_1/\omega}} \quad (3)$$

where $\varepsilon_1$, $\mu_1$ and $\sigma_1$ respectively represent a dielectric constant, a magnetic permeability and a conductivity of the medium 1, and $\varepsilon_2$, $\mu_2$ and $\sigma_2$ respectively represent a dielectric constant, a magnetic permeability and a conductivity of the medium 2. A reflection coefficient R is expressed by the following Formula 4 using a complex index of diffraction n when an incident electric field is in incidence plane, i.e., in a case of TM (Transverse Magnetic) incidence.

$$R = \frac{\mu_1 n^2 \cos\theta - \mu_2 \sqrt{n^2 - \sin^2\theta}}{\mu_1 n^2 \cos\theta + \mu_2 \sqrt{n^2 - \sin^2\theta}} \quad (4)$$

On the other hand, when an incident electric field is vertical to incidence plane, i.e., in a case of TE (Transverse Electric) incidence, a reflection coefficient R is expressed by the following Formula 5.

$$R = \frac{\mu_1 \cos\theta - \mu_2 \sqrt{n^2 - \sin^2\theta}}{\mu_1 \cos\theta + \mu_2 \sqrt{n^2 - \sin^2\theta}} \quad (5)$$

Subsequently, line segments $c_1$, $c_2$, $c_3$, . . . of diffracted waves of the ray which has been reflected on the building 13a at the point p and arrived at the point q of the building 13b are given. Here, when the ray is incident on a corner of the building 13b, i.e., the point q is positioned at the corner of the building 13b, a plurality of rays are surface radiated from the corner.

For regions through which the line segments $c_1$, $c_2$, $c_3$, . . . have passed, the following Formula 6 is recorded in corresponding elements ($L_k$, region numbers) of the matrix.

$$E_0 \frac{\exp(-jk(a+b))}{a+b} \cdot R \cdot D \cdot \exp(-jkr'') \sqrt{\frac{a+b}{r''(r''+a+b)}} \quad (6)$$

where b represents a length of the line segment b, r" represents distances from the point q as an origin to the centers of the respective regions, and D represents a diffraction coefficient, and is computed by the following Formula 7, using the coordinate system shown in FIG. 4.

$$D = -\hat{\beta}'_0 \hat{\beta}_0 D_s - \hat{\phi}' \hat{\phi} D_h \qquad (7)$$

where $\beta_0$, $\beta_0'$, $\phi$, $\phi'$, $\rho^d$ and $S^d$ are physical parameters indicative of the positional relationships shown in FIG. 4. In FIG. 4, $E^o$ represents an incident wave, and $E^d$ represents a diffracted wave. $D^s$ and $D^h$ are expressed by the following Formula 8 which uses UTD (refer to R. G. Kouyoumjian, P. H. Pthak, Proceedings of the IEEE, no. 11, pp. 1448–1461, December, 1974) using Fresnel integration function.

$$D_h^s = \frac{-\exp\left(-j\frac{\pi}{4}\right)}{2n\sqrt{2\pi k \sin\beta_0}} \times \qquad (8)$$

$$\left\{ \left[ \cot\left(\frac{\pi + (\phi - \phi')}{2n}\right) F(kLa^+(\phi - \phi')) + \cot\left(\frac{\pi + (\phi - \phi')}{2n}\right) \right. \right.$$

$$F(kLa^-(\phi - \phi')) \right] \mp \left[ \cot\left(\frac{\pi + (\phi + \phi')}{2n}\right) F(kLa^+(\phi + \phi')) + \right.$$

$$\left. \left. \cot\left(\frac{\pi + (\phi + \phi')}{2n}\right) F(kLa^-(\phi + \phi')) \right] \right\}$$

Here, L, $a^+(x)$ and $a^-(x)$ are respectively expressed by the following Formula 9.

$$L = \frac{s^2 \rho^d}{s^s + \rho^d}, \quad a^\pm(x) = 2\cos\left(\frac{2n\pi N^\pm - (x)}{2}\right) \qquad (9)$$

$N^+$ and $N^-$ are expressed by the following Formula 10.

$$N^\pm = \text{int}\left[\frac{\pm \pi + (x)}{2n\pi} + 0.5\right] \qquad (10)$$

The above-described operation is repeated, while changing a direction $L_k$ of the ray emitted by the monitor station 12a (emitting directions) to complete the matrix of an electric field intensity distribution for $L_k$ shown in TABLE 1. The completed matrix of the electric field intensity distribution is recorded in the data base 26. Thus, the simulation of radiowave propagation (simulated pattern) is completed.

In a case that, as shown in FIG. 1, a plurality of monitor stations 12a, 12b, 12c are positioned, the above-described simulation is performed by the monitor stations 12b and 12c besides the monitor station 12a, whereby the monitor operation can be performed simultaneously by a plurality of monitor stations. Since a plurality of monitor stations are used, all the regions become equally sensitive, and in addition, increased monitored data can improve accuracy of estimating a location of a radiowave emitting source.

As described above, the radiowave propagation simulation is conducted before the radiowave monitoring operation is started. The radiowave monitoring operation is performed in the sequence of the flow chart shown in FIG. 6.

First, the radiowave hologram observation is performed by the monitor station 12a to obtain reconstructed radiowave images (Step S11). The radiowave hologram observation enables the measurement with correlation between arrival directions and intensities of radiowaves.

Then, the comparing unit 28 compares arrival directions and intensity patterns (observed patterns) of the radiowaves based on the reconstructed radiowave images observed by the monitor station 12a with respective patterns (simulated patterns) of column vectors of the matrix of electric field intensity distributions stored in the data base 26 (Step S12).

In radiowave propagation, generally a radiowave propagation path is reversible between the emission side and the receiving side, and a propagation attenuation amount is also reversible, i.e., a propagation attenuation amount is the same when the emission and the receipt are replaced with one another.

Accordingly, out of column vectors of the matrix of electric field intensity distributions, a region having a region number of a most identical column vector (best correlation) is a location of the radiowave emitting source 10.

The use of the above noted method for identifying the radiowave emitting source 10 makes it unnecessary that when it is assumed that a radiowave emitting source is located at one of a plurality of positions in an area to be radiowave-monitored, reconstructed radiowave images observed by a monitor station are computed for the respective points by the computer simulation using map information, which can improve efficiency of the radiowave monitor.

For the above-described comparison for identifying the radiowave emitting source, the usual pattern matching may be used. For example, when a highest level of radiowaves of a reconstructed radiowave image is 0 dB, patterns for radiowave levels above −40 dB are compared to give a correlation coefficient as shapes. As an antenna directivity of a radiowave emitting source 10 is unknown, arrival directions of radiowaves can be detected with high accuracy.

When the monitor stations 12b and the monitor stations 12c in addition to the monitor station 12a concurrently perform the monitoring operation, a result of a simulated electric field intensity distribution of radiowave emission simulated in advance is stored in the data base 26 to be compared with a result obtained by actual radiowave hologram observation.

Next, after the location of the radiowave emitting source 10 is identified, radiowave propagation paths from the location of the radiowave emitting source 10 identified by the comparing unit 28 to the respective monitor stations 12a, 12b, 12c are traced by the direction finding trace preparing unit 30 to prepare and output a direction finding trace drawing 34 (Step S13).

Path information of rays corresponding to the matrix of the given electric field intensity distribution is recorded in the data base 26 when the computer simulation of an electric field intensity distribution of simulated radiowave emission from the monitor station 12a on the map data is executed, whereby simultaneously with the identification of a location of a radiowave emitting source 10, the result of tracing radiowave propagation paths can be obtained without the use of the direction finding trace drawing preparing unit 30.

Furthermore, based on the result of the above-described trace, antenna directivity of the radiowave emitting source 10 is estimated as follows (Step S14).

First, each monitor station 12a, 12b, 12c performs radiowave hologram observation to obtain reconstructed radiowave images. Arrival directions and intensities of the radiowaves for respective propagation paths are extracted from the reconstructed radiowave images obtained by each monitor station 12a, 12b, 12c.

Figure 5A:
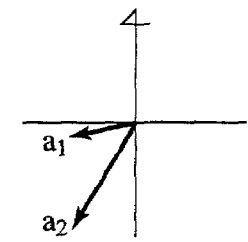
FIGS. 5A–5G are views explaining a method for estimating the directivity of a transmission antenna of a radiowave emitting source.
Figure 5B:
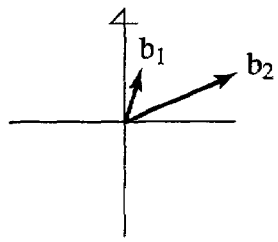
Figure 5C:
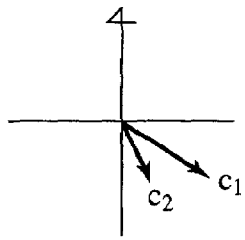

FIGS. 5A to 5C respectively show amplitudes of the radiowaves observed by the monitor stations 12a, 12b, 12c. The thick arrows indicate arrival directions of the radiowaves along propagation paths, and the lengths of the arrows indicate amplitudes of the radiowaves. In the shown example, amplitudes for the respective propagation paths are denoted by $a_1$, $a_2$, $b_1$, $b_2$, $c_1$, $c_2$. On the other hand, radiowave propagation is simulated by the simulator 24 on the assumption that a non-directional transmitting antenna is present at the location of the radiowave emitting source 10, which has been already identified, to obtain amplitudes of the radiowaves for the respective propagation paths by the respective monitor stations 12a, 12b, 12c.

Figure 5D:
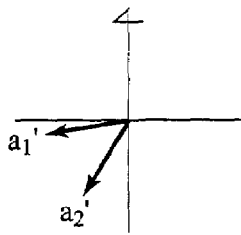
Figure 5E:
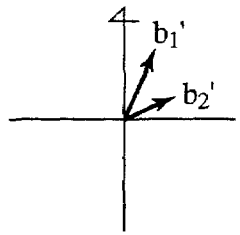
Figure 5F:
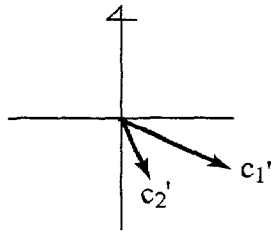

FIGS. 5D to 5F show amplitudes of radiowaves simulated by the respective monitor stations 12a, 12b, 12c. Amplitudes for respective propagation paths are denoted by $a_1'$, $a_2'$, $b_1'$, $b_2'$, $c_1'$, and $c_2'$. Amplitudes observed for the respective propagation paths $P_1$, $P_2$, $P_3$, $P_4$, $P_5$, $P_6$ are divided by amplitudes given by the simulation to obtain directivity of the transmitting antenna along the respective propagation paths at the location of the radiowave emitting source 10.

Figure 5G:
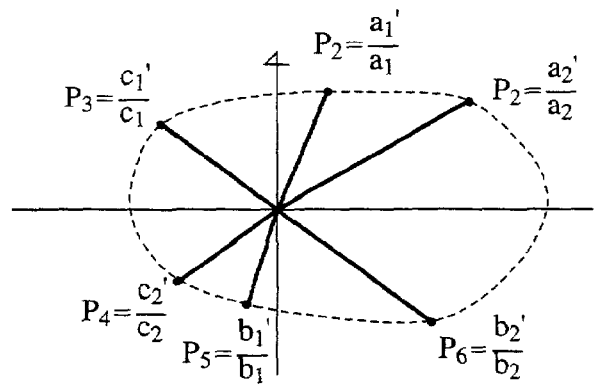

In FIG. 5G, the black points indicate directivity along the respective propagation paths. Interpolation computation is used in consideration of an estimated kind of the antenna to compute directional characteristics for arbitrary directions. The broken line in FIG. 5G indicates the thus-computed directional characteristics.

Based on the result of the estimation of the antenna directivity of the radiowave emitting source 10 by the direction finding trace drawing preparing unit 30, the radiowave activity map preparing unit 32 commands the simulation means 20 to execute the computer simulation of radiowave propagation to compute an electric field intensity distribution of the radiowaves from the radiowave emitting source 10 on a map. The result of the computation is displayed and printed out as a radiowave activity map 36 of the radiowave emitting source 10 (Step S15).

Thus, the radiowave emitting source 10 in a certain area is identified, and at the same time, a direction finding trace drawing is prepared, a directivity of the transmitting antenna of the radiowave emitting source 10 is estimated, and a radiowave activity map is prepared, and the radiowave monitoring operation is completed.

As described above, according to the present embodiment, when it is assumed that a radiowave emitting source is present at one of a plurality of positions in an area, it is not necessary to compute by the computer simulation reconstructed radiowave images observed by the monitor station, which can decrease the time for preparing the data base and accordingly can improve radiowave monitoring efficiency.

Figure 7:
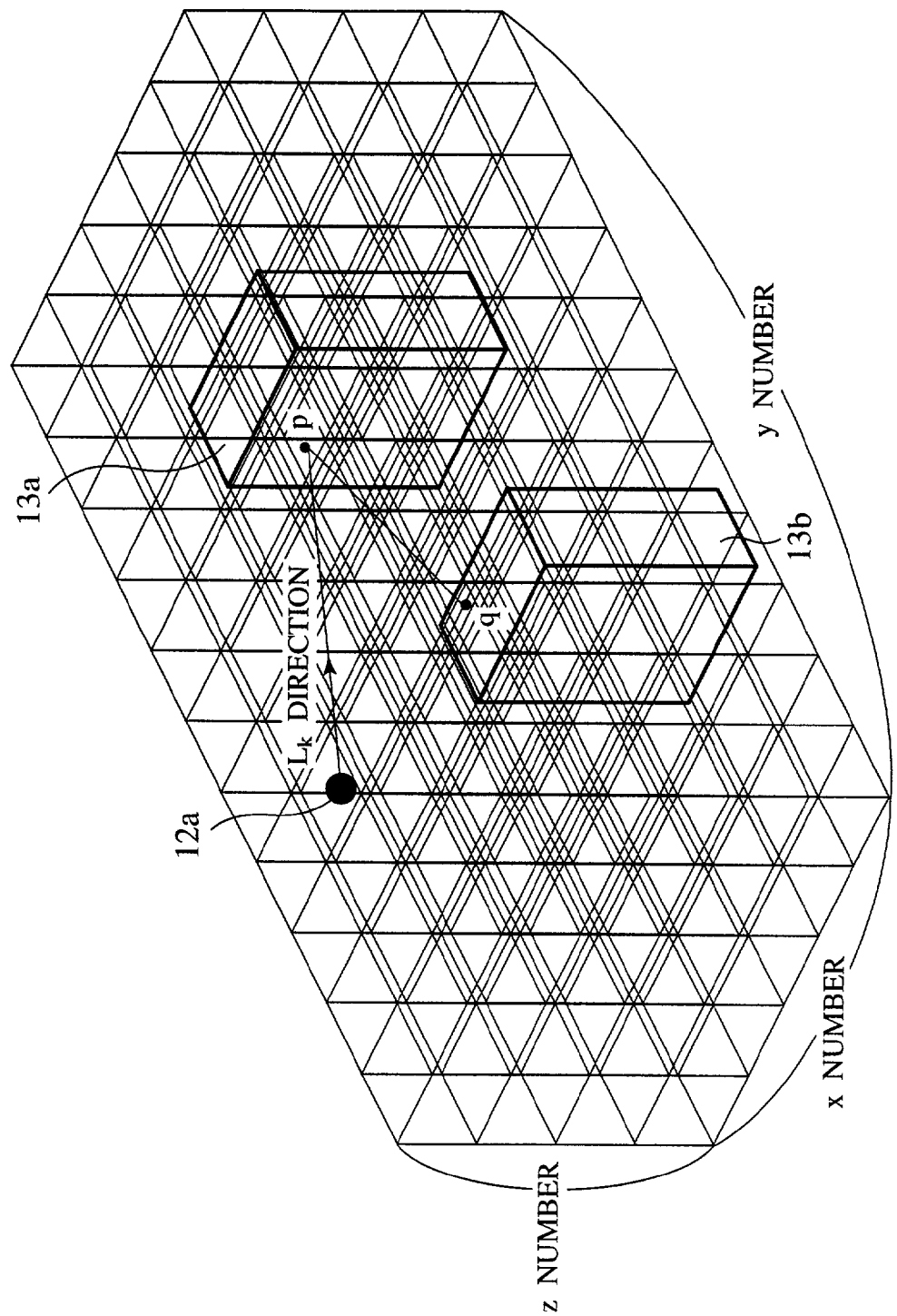
FIG. 7 is a diagram showing a three-dimensional radiowave propagation simulation model.

Next, the radiowave monitoring method and apparatus according to another embodiment of the present invention will be explained with reference to FIG. 7. FIG. 7 shows a three-dimensional radiowave propagation simulation model in the present invention.

The radiowave monitoring method and apparatus according to the present embodiment is characterized in that an electric field intensity distribution of simulated radiowave emission by a monitor station 12a on map data is simulated by using a three-dimensional model, thereby creating simulated patterns. The present embodiment is the same as the above-described embodiment except that an electrical field intensity distribution is simulated by using a three-dimensional model.

First, as shown in FIG. 7, a monitor area is divided in x×y×z unit spaces, and the respective spaces are represented by space numbers 1, 2, 3, . . . , xyz−1, xyz.

Subsequently, one ray is emitted in an $L_k$ direction (emitting direction) from a monitor station 12a on map data. Propagation paths of the ray and electric field intensities of the ray at the time when the ray passes the respective unit spaces are computed in the same way as in the two-dimensional model of the above-described embodiment. The computed electric field intensities are recorded as elements of the matrix of emitted ray numbers $L_k$ in the rows and unit space numbers in the columns.

At this time, the ray has a thickness proportional to a propagation distance from the monitor station 12a as an origin, and when the ray of the thickness covers parts of the respective regions, the ray is considered to have passed the regions. When a plurality of rays have passed through one region, an electric field intensity of that of the rays which shows a highest intensity is recorded in the matrix.

When a ray emitted from the monitor station 12a in an $L_k$ direction is reflected on a building 13a at a point p or diffracted at a point q of building 13b, electric field intensities of the ray are computed in the same way as in the above-described embodiment. Directions of the reflection and the diffraction are determined in consideration of three-dimensional information of the buildings 13a, 13b.

The above-described operation is repeated while three-dimensionally changing the directions of the rays emitted by the monitor station 12a (emitting directions) to complete the matrix of an electric field intensity distribution of the rays $L_k$ in the same way as in the two-dimensional model. The thus-obtained matrix (simulated patterns) of an electric field intensity distribution is recorded in the data base 26. Thus, the radiowave propagation simulation is completed.

Using a result of the above-described radiowave propagation simulation, the radiowave monitoring operation can be performed in accordance with the flow chart shown in FIG. 6 in the same manner as in the above-described embodiment.

As described above, according to the present embodiment, it is unnecessary that when it is assumed that a radiowave emitting source is located at one of a plurality of positions in an area to be radiowave-monitored, reconstructed radiowave images observed by a monitor station are computed for the respective points by the computer simulation using map information, which can decrease the time for preparing data base and can improve efficiency of the radiowave monitor.

What is claimed is:

1. A radiowave monitoring method comprising the steps of:
    creating simulated patterns of intensities and emitting directions of a simulated radiowave emission from one position in an observation area, the simulated patterns of intensities and emitting directions being produced through computer simulation for plural positions in the observation area;
    obtaining an observed pattern of intensities and arrival directions of a radiowave which is emitted from a radiowave emitting source, the observed pattern of intensities and arrival directions being obtained at said one position;
    comparing the simulated patterns at said plural positions with the observed pattern at said one position; and
    identifying a position out of said plural positions whose simulated pattern shows the best correlation with the observed pattern at said one position as a location of the radiowave emitting source.

2. A radiowave monitoring method according to claim 1, wherein in creating the simulated patterns of intensities and emitting directions of the simulated radiowave emission from said one position, the observation area is two-dimensionally divided into a plurality of regions, and electric field intensities to be observed in the respective regions are computed.

3. A radiowave monitoring method according to claim 2, wherein
in creating the simulated patterns of intensities and emitting directions of the simulated radiowave emission from said one position, while changing the emitting direction of the simulated radiowave emission from said one position, the electric field intensities to be observed in the respective regions are computed to obtain electric field intensity distributions for the respective emitting directions.

4. A radiowave monitoring method according to claim 1, wherein
in creating the simulated patterns of intensities and emitting directions of the simulated radiowave emission from said one position, the observation area is three-dimensionally divided into a plurality of spaces, and electric field intensities to be observed in the respective spaces are computed.

5. A radiowave monitoring method according to claim 4, wherein
in creating the simulated patterns of intensities and emitting directions of the simulated radiowave emission from said one position, while changing the emitting direction of the simulated radiowave emission from said one position, the electric field intensities to be observed in the respective regions are computed to obtain electric field intensity distributions for the respective emitting directions.

6. A radiowave monitoring method according to claim 2, wherein
in creating the simulated patterns of intensities and emitting directions of the simulated radiowave emission from said one position, geography and ground objects in the observation area are taken into consideration.

7. A radiowave monitoring method according to claim 4, wherein
in creating the simulated patterns of intensities and emitting directions of the simulated radiowave emission from said one position, geography and ground objects in the observation area are taken into consideration.

8. A radiowave monitoring method according to claim 1, wherein
based on the location of the identified radiowave emitting source and the simulated patterns, propagation path of the radiowave from the radiowave emitting source to said one position is traced.

9. A radiowave monitoring method according to claim 8, wherein
based on a result of tracing the propagation path, antenna directivity of the radiowave emitting source is estimated.

10. A radiowave monitoring method according to claim 9, wherein
based on the estimated antenna directivity of the radiowave emitting source, an electric field intensity distribution of the radiowave emitted from the radiowave emitting source is computed.

11. A radiowave monitoring apparatus comprising:
a radiowave observing means disposed at one position in an observation area, for observing a pattern of intensities and arrival directions of a radiowave emitted from a radiowave emitting source;
a simulation means for generating simulated patterns of intensities and emitting directions of a simulated radiowave emission from one position to a plurality of positions in the observation area through computations performed while changing the emitting direction of the simulated radiowave and storing the results; and
a radiowave emitting source identifying means for comparing the pattern observed by the radiowave observing means at said one position with the simulated patterns of said plurality of position stored in the simulation means to identify a position out of said plurality of positions whose simulated pattern shows the best correlation with the pattern observed by the radiowave observing means at said one position as a location of a radiowave emitting source.

12. A radiowave monitoring apparatus according to claim 11, wherein
the simulation means two-dimensionally divides the observation area into a plurality of regions, and computes electric field intensities of the simulated radiowave emission from said one position, which are to be observed in the respective regions.

13. A radiowave monitoring apparatus according to claim 12, wherein
the simulation means stores electric field intensities of the simulated radiowave emission from said one position in different emitting directions, which are to be observed in the respective regions, for the respective directions.

14. A radiowave monitoring apparatus according to claim 11, wherein
the simulation means three-dimensionally divides the observation area into a plurality of spaces and computes electric field intensities of the simulated radiowave emission from said one position, which are to be observed in the respective spaces.

15. A radiowave monitoring apparatus according to claim 14, wherein
the simulation means stores electric field intensities of the simulated radiowave emission from said one position in different emitting directions, which are to be observed in the respective spaces, for the respective directions.

* * * * *